(12) United States Patent
Marwali et al.

(10) Patent No.: US 10,587,119 B2
(45) Date of Patent: Mar. 10, 2020

(54) ACTIVE POWER FILTER WITH ADJUSTABLE NEUTRAL CURRENT LIMIT

(71) Applicant: SCHNEIDER ELECTRIC USA, INC., Andover, MA (US)

(72) Inventors: Mohammad Nanda Rahmana Marwali, Salem, OR (US); Thierry Bravais, Eybens (FR); John Simon Batch, Salem, OR (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 16/164,012

(22) Filed: Oct. 18, 2018

(65) Prior Publication Data
US 2020/0007024 A1  Jan. 2, 2020

Related U.S. Application Data

(60) Provisional application No. 62/690,548, filed on Jun. 27, 2018.

(51) Int. Cl.
*H02J 3/18* (2006.01)
*H02M 1/12* (2006.01)
(Continued)

(52) U.S. Cl.
CPC .............. *H02J 3/1835* (2013.01); *G05F 1/70* (2013.01); *H02J 3/26* (2013.01); *H02M 1/12* (2013.01);
(Continued)

(58) Field of Classification Search
CPC .... H02M 1/32; H02M 1/4233; H02M 1/4216; H02M 1/12; G05F 1/44; G05F 1/70;
(Continued)

(56) References Cited

U.S. PATENT DOCUMENTS 5,148,362 A * 9/1992 Braun ................. H02J 3/26
363/37
5,539,632 A * 7/1996 Marsh ................. H02J 3/26
323/361
(Continued)

FOREIGN PATENT DOCUMENTS

WO   WO-2009090889 A1 * 7/2009 ................ H02J 3/26

OTHER PUBLICATIONS

Extended European Search Report from corresponding European Application No. 19182180.0 dated Oct. 17, 2019.
(Continued)

*Primary Examiner* — Fred E Finch, III
(74) *Attorney, Agent, or Firm* — Lando & Anastasi, LLP

(57) ABSTRACT

According to one aspect of the disclosure, a power filter is provided including a first input configured to receive measurements of electrical characteristics of source power lines from a power source, a second input configured to receive measurements of electrical characteristics of load power lines to a load, an output configured to couple to output power lines to provide output current compensation signals, a power converter coupled to the power output and configured to receive input power, receive input control signals and provide the output current compensation signals based on the input control signals, and a controller configured to provide the control signals to the power converter, wherein the controller receives an indication of a neutral current limit, and the controller is configured to adjust the control signals based on the indication of the neutral current limit to limit current on a neutral of the output power line.

20 Claims, 7 Drawing Sheets

(51) Int. Cl.
*H02J 3/26* (2006.01)
*G05F 1/70* (2006.01)
*H02M 1/42* (2007.01)

(52) U.S. Cl.
CPC .......... *H02J 3/1842* (2013.01); *H02M 1/4216* (2013.01)

(58) Field of Classification Search
CPC .......... H02J 3/1842; H02J 3/1857; H02J 3/26; H02H 9/02; H02H 9/025
See application file for complete search history.

(56) References Cited

U.S. PATENT DOCUMENTS

| | | | | |
|---|---|---|---|---|
| 5,568,371 A * | 10/1996 | Pitel | ...................... | H02J 3/01 361/113 |
| 6,215,677 B1 * | 4/2001 | Karlsson | ................ | G01R 15/18 363/84 |
| 2003/0043515 A1 * | 3/2003 | Brungs | .................... | H02H 9/08 361/42 |
| 2004/0196604 A1 * | 10/2004 | Matsumoto | ............... | H02J 3/26 361/62 |
| 2005/0253564 A1 * | 11/2005 | Choi | ..................... | H02J 3/1842 323/207 |
| 2006/0192520 A1 * | 8/2006 | Yin | ................... | H02M 7/53873 318/802 |
| 2009/0085403 A1 * | 4/2009 | Kim | ........................ | H02J 3/26 307/38 |
| 2010/0191487 A1 * | 7/2010 | Rada | ........................ | G05F 1/70 702/60 |
| 2012/0074779 A1 * | 3/2012 | Black | ........................ | H02J 3/26 307/31 |
| 2013/0024149 A1 * | 1/2013 | Nayar | ....................... | H02J 3/26 702/72 |
| 2014/0001850 A1 * | 1/2014 | Guillemin | .................. | H02J 3/26 307/31 |
| 2014/0021917 A1 * | 1/2014 | Paupert | ..................... | H02J 3/26 361/62 |
| 2014/0277801 A1 * | 9/2014 | Cioraca | .................. | G01R 15/18 363/84 |
| 2015/0349529 A1 * | 12/2015 | Arya | ........................ | H02J 3/26 363/37 |
| 2016/0248263 A1 * | 8/2016 | Hunt | ........................ | H02H 9/08 361/42 |
| 2016/0365727 A1 * | 12/2016 | Kam | ........................ | H02J 3/01 361/113 |
| 2017/0242469 A1 * | 8/2017 | Harris | ................... | H02J 3/1842 323/207 |

OTHER PUBLICATIONS

Hosseini S.H. et al, "Power quality enhancement using a new hybrid active power filter under non-ideal source and load conditions", Power&Energy Society General Meeting, 2009, PES '09, IEEE, IEEE, Piscataway, NJ, USA, Jul. 26, 2009 (Jul. 26, 2009), pp. 1-6, XP031538422,ISBN: 978-1-4244-4241-6.

\* cited by examiner

ACTIVE POWER FILTER WITH ADJUSTABLE NEUTRAL CURRENT LIMIT

CROSS-REFERENCE TO RELATED APPLICATIONS

This application claims priority to U.S. Provisional Application Ser. No. 62/690,548, titled "ACTIVE POWER FILTER WITH ADJUSTABLE NEUTRAL CURRENT LIMIT," filed on Jun. 27, 2018, which is incorporated herein by reference in its entirety.

BACKGROUND OF THE INVENTION

1. Field of the Invention

At least one example in accordance with the present disclosure relates generally to power systems.

2. Discussion of Related Art

The implementation of power filters between a power source and a load is known. For example, active power filters may be coupled in parallel with a load and controlled to actively filter the power from the source to the load.

SUMMARY

According to at least one aspect of the present invention, a power filter is provided having a first input configured to receive measurements of electrical characteristics of source power lines from a power source, wherein the source power lines include a first phase line, a second phase line, a third phase line and a neutral, a second input configured to receive measurements of electrical characteristics of load power lines to a load, wherein the load power lines include a first phase line, a second phase line, a third phase line and a neutral, an output configured to couple to output power lines to provide output current compensation signals, wherein the output power lines include a first phase line, a second phase line, a third phase line and a neutral, a power converter coupled to the power output and configured to receive input power, receive input control signals and provide the output current compensation signals based on the input control signals, and a controller coupled to the first input, the second input and the power converter and configured to provide the control signals to the power converter, wherein the controller has an input to receive an indication of a neutral current limit, and the controller is configured to adjust the control signals based on the indication of the neutral current limit to limit current on the neutral of the output power line.

In one embodiment, the controller is further configured to limit current on the neutral of the output current signal by adjusting the control signals based on a ratio between the neutral current limit and a neutral current reference signal. In some embodiments, the controller is further configured to generate reference signals, based on the measurements of electrical characteristics of source power lines from a power source, to correct at least one of harmonic distortion, power factor and load balance created by a load, and the controller is configured to generate the neutral current reference signal based on the reference signals. In an embodiment, the controller is further configured to generate reference signals, based on the measurements of electrical characteristics of source power lines from the power source, to correct at least one of harmonic distortion, power factor and load balance created by a load, wherein the reference signals include a first phase reference signal, a second phase reference signal and a third phase reference signal and the controller is configured to perform an orthogonal transform on the reference signals and generate the control signals to limit the current on the neutral of the output current signal based on a result of the orthogonal transform.

In some embodiments, the power filter further includes a user interface, coupled to the controller, to receive the indication of the neutral current limit from a user. In one embodiment, the indication of the neutral current limit is input by a user as a percentage of a rated output of the power filter. In some embodiments, the output current signals are AC output current signals, and wherein the power converter is configured to receive input power and to provide the output AC current signals based on the control signals. In an embodiment, the control signals are configured to control the power converter using pulse width modulation.

According to an aspect of the disclosure, a method of operating a power filter to control characteristics of power from a source to a load is provided including receiving measurements of electrical characteristics of source power lines from the power source, wherein the source power lines include a first phase line, a second phase line, a third phase line and a neutral, receiving measurements of electrical characteristics of power lines to the load, wherein the load power lines include a first phase line, a second phase line, a third phase line and a neutral, providing output power current compensation signals at output power lines, wherein the output power lines include a first phase line, a second phase line, a third phase line and a neutral, receiving an indication of a neutral current limit, and controlling current on the neutral of the output power lines based on the indication of the neutral current limit.

In one embodiment, the power filter includes a power converter that receives control signals and provides the output power current compensation signals based on the control signals, and wherein the method further includes limiting current on the neutral of the output power lines by adjusting the control signals based on a ratio between the neutral current limit and a neutral current reference signal. In some embodiments, providing output power current compensation signals includes correcting at least one of harmonic distortion, power factor and load balance created by the load. In an embodiment, the power filter includes a power converter that receives control signals and provides the output power current compensation signals based on the control signals, and wherein the method further includes generating reference signals, based on the measurements of electrical characteristics of source power lines from a power source, to correct at least one of harmonic distortion, power factor and load balance created by a load, wherein the reference signals include a first phase reference signal, a second phase reference signal and a third phase reference signal, and wherein the method further includes performing an orthogonal transform on the reference signals and generating the control signals to limit the current on the neutral of the output power compensation signal based on a result of the orthogonal transform.

In one embodiment, the method further includes receiving the indication of a neutral current limit from a user through a user interface. In some embodiments, the indication of the neutral current limit is input by a user as a percentage of a rated output of the power filter. In an embodiment, the output power current compensation signals are AC output current signals, and wherein the method further includes receiving AC power, converting the AC power to DC power and converting the DC power to AC power based on the control signals. In an embodiment, the method further includes converting the DC power to AC power using pulse width modulation.

According to one aspect of the disclosure, a power filter is provided having a first input configured to receive measurements of electrical characteristics of source power lines from a power source, wherein the source power lines include a first phase line, a second phase line, a third phase line and a neutral, a second input configured to receive measurements of electrical characteristics of load power lines to a load, wherein the load power lines include a first phase line, a second phase line, a third phase line and a neutral, an output configured to couple to output power lines to provide output current compensation signals, wherein the output power lines include a first phase line, a second phase line, a third phase line and a neutral, a power converter coupled to the power output and configured to receive input power, receive input control signals and provide the output current signals based on the input control signals, and means for adjusting the control signals based on the indication of the neutral current limit to limit current on the neutral of the output current signal.

In one embodiment, the power filter further includes a user interface to receive the indication of the neutral current limit from a user. In an embodiment, the indication of the neutral current limit is input by a user as a percentage of a rated output of the power filter. In some embodiments, the power filter further includes means for providing output power current compensation signals to correct at least one of harmonic distortion, power factor and load balance created by the load.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION OF THE INVENTION

Figure 1:
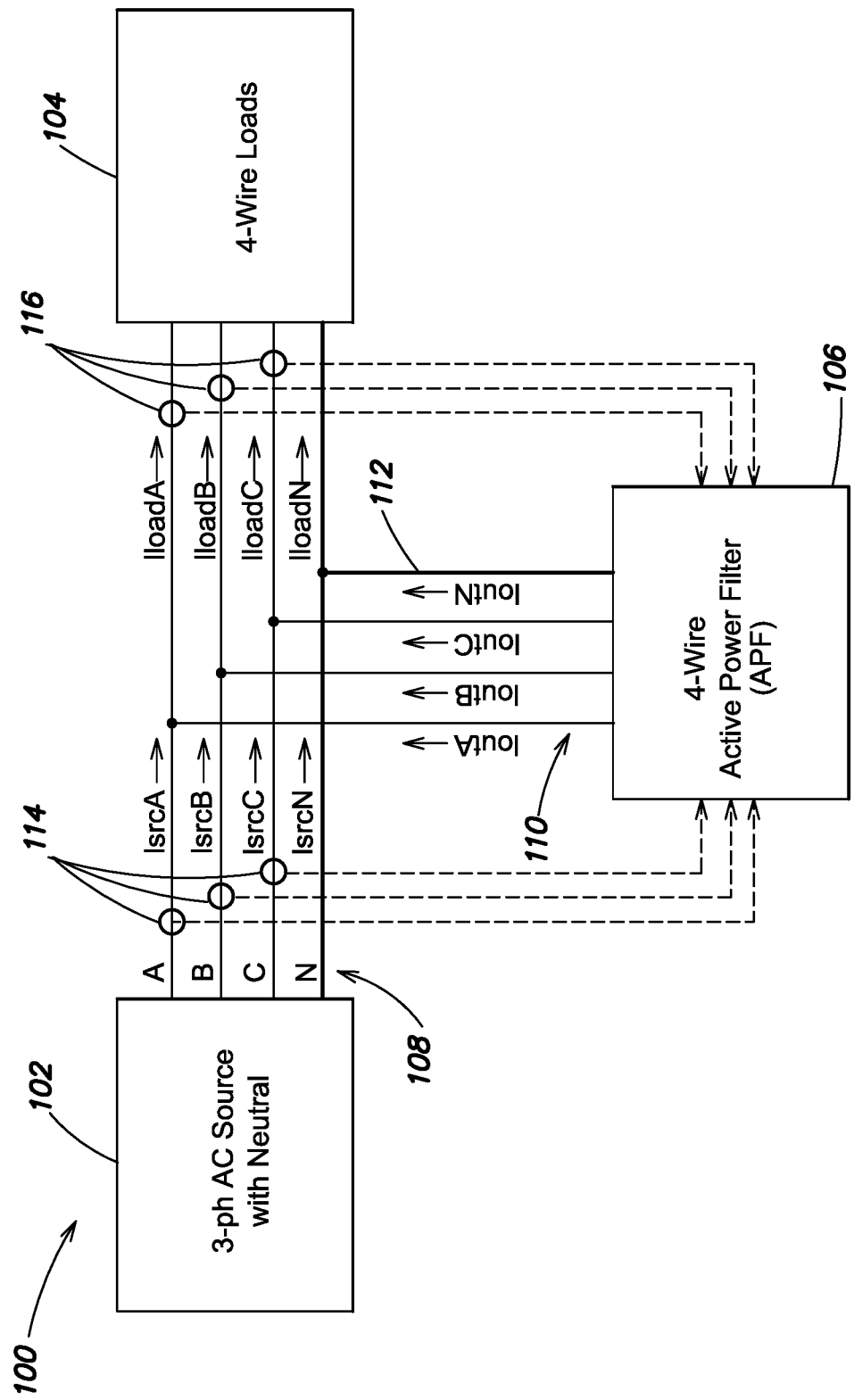
FIG. 1 illustrates a block diagram of a power system according to one embodiment.

Examples of the methods and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are no intended to limit the presently disclosed systems or methods, their components, acts, or elements. The use herein of "including," "comprising," "having," "containing," "involving," and variations thereof is meant to encompass the items listed thereafter and equivalents thereof as well as additional items.

References to "or" may be construed as inclusive so that any terms described using "or" may indicate any of a single, more than one, and all of the described terms. In addition, in the event of inconsistent usages of terms between this document and documents incorporated herein by reference, the term usage in the incorporated features is supplementary to that of this document; for irreconcilable differences, the term usage in this document controls.

As discussed above, Active Power Filters (APFs) are configured to improve quality of a three phase power system. A conventional power system might include a power source, such as a three-phase Alternating Current (AC) power source, and a load, such as a three-phase load. The power source may be coupled to the load via several conductors, including three phase conductors and a neutral conductor.

Power provided by the power source may include undesirable electrical characteristics which decrease the quality of the power. The undesirable electrical characteristics include harmonics, low Power Factor (PF), and an imbalanced fundamental frequency content, and may be caused by operation of the power system and/or the load. An APF is typically connected in parallel with the load via one or more conductors, including three phase conductors and a neutral conductor, to improve the quality of the power. For example, the APF may be configured to sense characteristics of the power provided between the power source and the load, analyze the sensed characteristics, and inject compensation current via the one or more conductors to the load to compensate for low power quality.

In some conventional power systems, the one or more conductors connecting the APF to the power source and load may be sized to support a highest-possible power rating of the APF. For example, where the one or more conductors include three phase conductors and a neutral conductor, each of the three phase conductors may be sized to support a peak phase current. The neutral conductor may be sized approximately three times larger than each phase conductor to support a highest-current scenario in which each phase of the three phases constructively interferes with one another, yielding a current approximately three times larger than the current supported by each individual phase conductor.

Embodiments of the present invention enable an adjustable limit to be set on a current conducted by a neutral current conductor of an APF, allowing the neutral conductor and associated fuses, circuit breakers and other components to have lower ratings and cost. Conventional APFs may rarely or never conduct a maximum-possible current, but may still have neutral conductors sized to support the maximum-possible current. Implementation of a large neutral conductor may be expensive, and may not be cost-effective as compared to a frequency at which the neutral conductor conducts the maximum current. Accordingly, at least one embodiment of the present invention enables a user to specify a maximum current which may be conducted by the neutral conductor of an APF. The user may then select a neutral conductor size, and sizes of the related components sufficient to support the specified maximum current, which may be more cost-effective.

FIG. 1 illustrates a block diagram of a power system 100 according to one embodiment. The power system 100 includes a power source 102, one or more loads 104, and an APF 106. The power source 102 is coupled to the one or more loads 104 via power lines 108, including an A-phase conductor, a B-phase conductor, a C-phase conductor, and a neutral conductor. The APF 106 is coupled to the power lines 108 via power lines 110, including an A-phase conductor coupled to the A-phase conductor of the power lines 108, a B-phase conductor coupled to the B-phase conductor of the power lines 108, a C-phase conductor coupled to the C-phase conductor of the power lines 108, and a neutral conductor 112 coupled to the neutral conductor of the power lines 108.

The power system 100 further includes source Current Transformers (CTs) 114 coupled to the power source 102 and load CTs 116 coupled to the one or more loads 104. In alternate embodiments, the power system 100 may include either the source CTs 114 or the load CTs 116. Each source CT of the source CTs 114 is coupled to a respective phase conductor of the power lines 108 at an output of the power source 102, and is configured to be communicatively coupled to the APF 106. Each load CT of the load CTs 116 is coupled to a respective phase conductor of the power lines 108 at an input to the one or more loads 104, and is configured to be communicatively coupled to the APF 106.

For example, the source CTs 114 may be configured to sense one or more characteristics of current provided by the power source 102 and provide one or more communication signals indicative of the one or more characteristics to the APF 106. The load CTs 116 may be configured to sense one or more characteristics of current provided to the one or more loads 104, and provide one or more communication signals indicative of the one or more characteristics to the APF 106.

Figure 2:
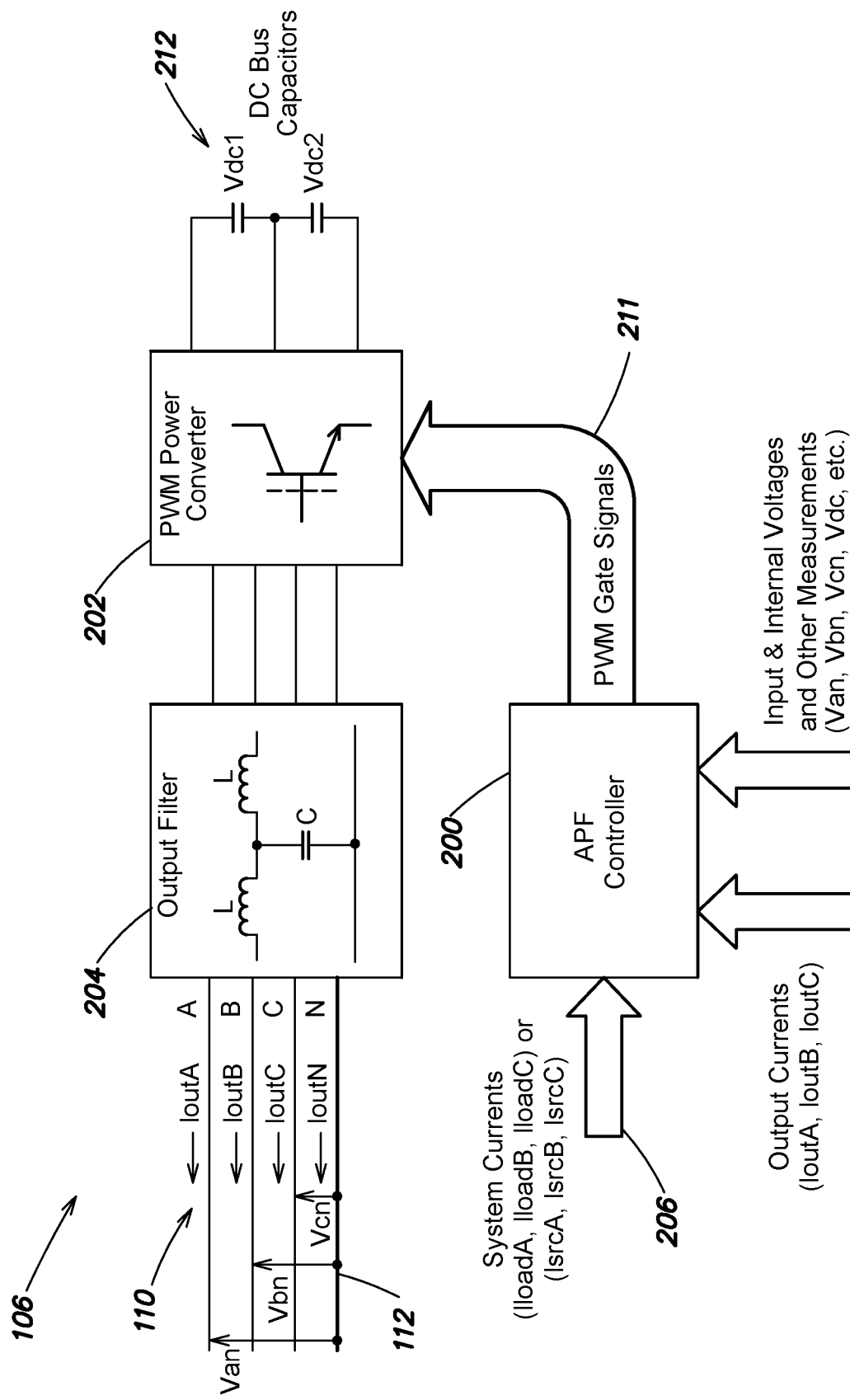
FIG. 2 illustrates a block diagram of an active power filter according to one embodiment.

FIG. 2 illustrates a block diagram of the APF 106. The APF 106 includes APF control circuitry 200, a Pulse Width Modulation (PWM) power converter 202, and an output filter 204. The APF control circuitry 200 receives measurement signals including system current signals IloadA, IloadB, IloadC or IsrcA, IsrcB, IsrcC 206, output current compensation signals IoutA, IoutB, IoutC 208, and input and internal voltage measurement signals Van, Vbn, Vcn, Vdc 210. The system current signals 206 may be received from either or both of the source CTs 114 and the load CTs 116. The signals 208 and 210 may be sensed by one or more sensors coupled to the power lines 110.

The APF control circuitry 200 is configured to receive the signals 206-210, analyze the signals 206-210 to determine a quality of power on the power lines between the one or more loads 104 and the power source 102, generate one or more PWM gate signals 211, and provide the PWM gate signals 211 to the PWM power converter 202. The PWM power converter 202, which may include one or more Insulated Gate Bipolar Transistors (IGBTs), modulates a state of the IGBTs based on the one or more PWM gate signals 211 received from the APF control circuitry 200 to provide compensation current to the power lines between the power source 012 and the one or more loads 104 via the output filter 204. For example, the compensation current provided by the PWM power converter 202 may be derived from one or more DC bus capacitors 212 coupled to the PWM power converter 202. The DC voltage on the one or more DC capacitors 212 may be derived from AC power from the power source 102. The output filter 204 is configured to filter the compensation current received from the PWM power converter 202, and output the compensation current to the power lines 110.

Figure 3:
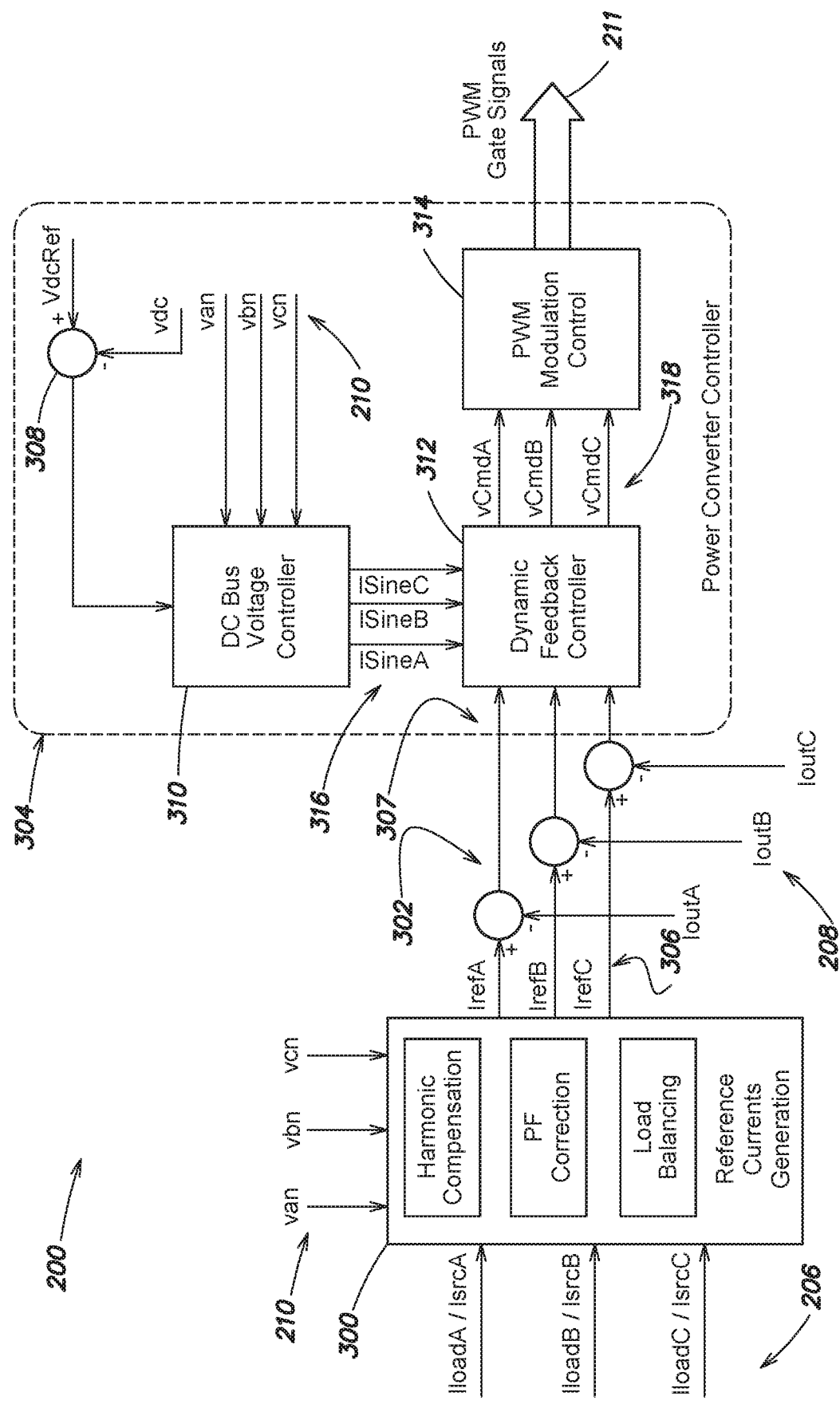
FIG. 3 illustrates a block diagram of conventional active power filter control circuitry.

FIG. 3 illustrates a block diagram of the APF control circuitry 200. The APF control circuitry 200 includes reference current generator 300, error signal generator 302, and power converter control circuitry 304. The reference current generator 300 is configured to receive the system current signals 206 and the input and internal voltage measurement signals 210 and, based on the signals 206 and 210, generate reference current signals IrefA, IrefB, IrefC 306. For example, the reference current signals 306 may represent a target value of the signals 208.

The error signal generator 302 is configured to receive the reference current signals 306 and the output current signals 208, determine an error between each phase of the reference current signals 306 and the output current signals 208, and output error signals 307 to the power converter control circuitry 304. For example, the error signals 307 may be indicative of an error between IrefA and IoutA, IrefB and IoutB, and IrefC and IoutC of the signals 306 and 208, respectively.

The power converter control circuitry 304 is configured to receive the error signals 307 from the error signal generator 302, analyze the error signals 307 to generate the one or more PWM gate signals 211, and output the PWM gate signals 211. The power converter control circuitry 304 includes an error signal generator 308, Direct Current (DC) bus voltage control circuitry 310, dynamic feedback control circuitry 312, and PWM modulation control circuitry 314.

The error signal generator 308 is configured to receive a DC current reference signal VdcRef and the DC bus voltage measurement Vdc of the input and internal voltage measurement signals 210. In one embodiment, the voltage measurement Vdc is indicative of a DC voltage on the one or more DC bus capacitors 212, and VdcRef is indicative of a target DC voltage for the voltage measurement Vdc. The error signal generator 308 determines a difference between the input voltages VdcRef and Vdc and outputs an error signal indicative of the difference between the input voltages VdcRef and Vdc to the DC bus voltage control circuitry 310.

The DC bus voltage control circuitry 310 is configured to regulate DC voltages of the DC bus capacitors of 212. The DC bus voltage control circuitry 310 receives the error signal indicative of the difference between the input voltages VdcRef and Vdc, and receives the phase-neutral voltage signals Van, Vbn, Vcn of the input and internal voltage measurement signals 210. The phase-neutral voltage signals Van, Vbn, Vcn are respectively indicative of a voltage of the phase of the A-phase, B-phase, and C-phase conductors of the power lines 110 relative to the neutral conductor 112. In one example, the DC bus voltage control circuitry 310 generates, based on the received signals 210, 310, current signals IsineA, IsineB, IsineC 316 to regulate the DC voltages of the one or more DC capacitors 212, and provides the current signals 316 to the dynamic feedback control circuitry 312.

The dynamic feedback control circuitry 312 is configured to reduce an error between the output current signals 208 and the reference current signals 306 based on the output error signals 307 and the current signals 316. The dynamic feedback control circuitry 312 is configured to generate voltage command signals vCmdA, vCmdB, vCmdC 318 to control a voltage on each phase of the output power, and provide the voltage command signals 318 to the PWM modulation control circuitry 314.

The PWM modulation control circuitry 314 is configured to receive the voltage command signals 318 and determine, based on the voltage command signals 318, the one or more PWM gate signals 211. The PWM modulation control circuitry 314 provides the one or more PWM gate signals 211 to the PWM power converter 202, as discussed above.

As discussed above, conventional APFs may include neutral conductors sized to support a highest-possible current. For example, the neutral conductor 112 may be sized to support three times a rated current of each respective phase provided by the power source 102 to account for a situation in which each phase of current provided by the power source 102 is constructively in-phase with one another, such as in the case of triplen harmonics ($3^{rd}$, $6^{th}$, $9^{th}$ . . . ). The neutral conductor 112 may further be coupled to circuit protection circuitry such as a breaker or fuse, which may be similarly sized to account for the highest-possible current.

A situation in which the highest-possible current is provided (for example, three times a rated current of each respective phase) may be referred to herein as a "worst-case" scenario, at least because the components of the APF 106 are subject to electrical stress which increases in proportion with the current through the components. Accordingly, the components of the APF 106 are subject to a highest level of electrical stress when a highest-possible current passes through the components. Implementing the neutral conductor 112 and the associated circuit protection circuitry to account for a worst-case scenario may require that the neutral conductor 112 and the associated circuit protection circuitry be expensive, at least because the cost of the neutral conductor 112 and the associated circuit protection circuitry increases with the size of the neutral conductor 112.

In one embodiment, a maximum current conducted by a neutral conductor of the APF 106 is limited to a maximum value. For example, a user may select a maximum value of the current conducted by the neutral conductor via a user interface and select a neutral conductor size corresponding to the selected maximum value of the current. In one example, the APF is a three-phase APF, and the user may select a maximum value of the current conducted by the neutral conductor as a value relative to a rated current of each phase of the three-phase APF.

For example, the user may select the maximum value to be 167% of the rated current of each phase of the three-phase APF, and may select a neutral conductor size corresponding to a current value approximately equal to 167% of the rated current. In at least one implementation, a neutral current limiter is added to implement the maximum value selected by the user. For example, the neutral current limiter may limit one or more current reference signals to a maximum value such that the maximum neutral output current is limited by the current reference signals used to control the neural output current.

Figure 4:
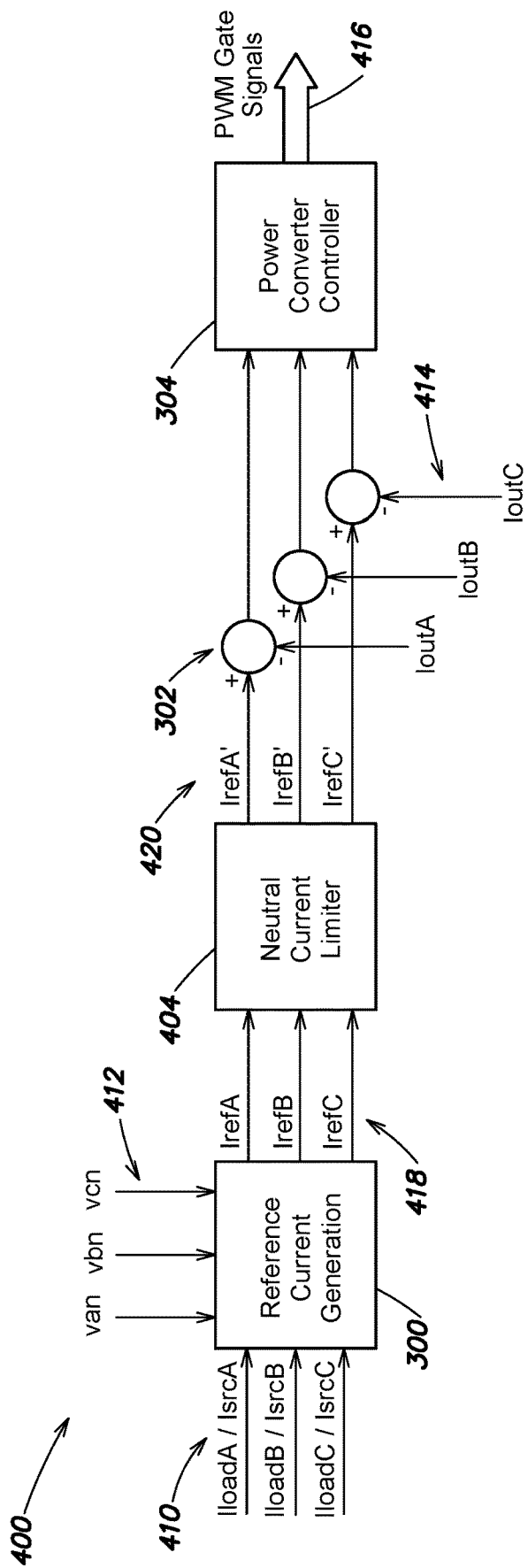
FIG. 4 illustrates a block diagram of active power filter control circuitry according to an embodiment.

FIG. 4 illustrates a block diagram of APF control circuitry 400 according to an embodiment. The control circuitry 400 is contained in the APF control circuitry 200 of FIG. 2. The APF control circuitry 400 includes a reference current generator 300, a neutral current limiter 404, an error generator 302, and a power converter controller 304. The APF control circuitry 400 is configured to receive load current signals IloadA, IloadB, IloadC or IsrcA, IsrcB, IsrcC 410, output voltage signals van, vbn, vcn 412, and output current signals IoutA, IoutB, IoutC 414, and is configured to output PWM gate signals 416.

The load current signals 410 are indicative of a current of each phase of power provided to a load. In one example, the load is provided with three-phase power, and the load current signals 410 are indicative of A-phase, B-phase, and C-phase current provided to the load. The load current signals 410 are provided to the reference current generator 300.

The output voltage signals 412 are indicative of a voltage of each phase of power provided by an APF coupled to the APF control circuitry 400. In one example, the APF provides three-phase power, and the load voltage signals 412 are indicative of A-phase, B-phase, and C-phase voltage provided by the APF to a load relative to neutral. The output voltage signals 412 are provided to the reference current generator 300.

The output current signals 414 are indicative of a phase current of each phase of compensation current provided by an APF coupled to the APF control circuitry 400. In one example, the APF provides three-phase power, and the output current signals 414 are indicative of A-phase, B-phase, and C-phase compensation current provided by the APF to a load. The output current signals 414 are provided to the error generator 302.

The PWM gate signals 416 are configured to control switching operation of one or more switches. For example, the PWM gate signals 416 may be provided to one or more IGBTs in the PWM power converter 202. Controlling the switching operation of the one or more switches may include controlling an amount of compensation current provided to the load by the APF coupled to the APF control circuitry. In alternate embodiments, alternate switches may be implemented. The neutral current limiter 404 is configured to limit a neutral current provided by the APF. For example, the neutral current limiter 404 may limit the neutral current by modulating the current reference signals 418 to produce modulated current reference signals 420. In one embodiment, the neutral current limiter 404 may modulate the current reference signals 418 by limiting the current reference signals 418 to a maximum value and providing the modulated current reference signals 420 to the error generator 302. Limiting the current reference signals 418 to a maximum value may affect the PWM gate signals 416 and, consequently, limit an amount of compensation current provided by the switches controlled by the PWM gate signals 416. Limiting the compensation current may limit the total neutral current. Accordingly, by limiting the current reference signals 418, the neutral current limiter 404 is configured to limit the maximum neutral current of the APF.

Figure 5:
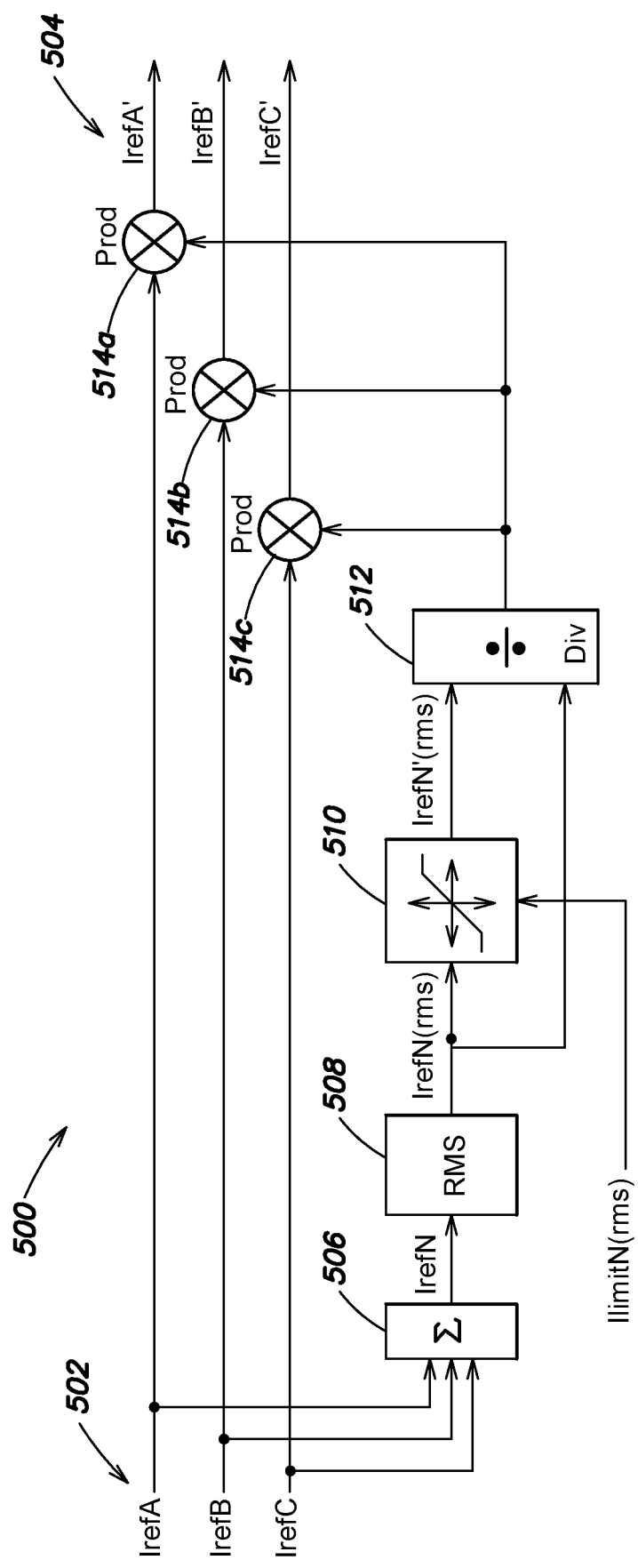
FIG. 5 illustrates a block diagram of a neutral current limiter according to an embodiment.

FIG. 5 illustrates a block diagram of a neutral current limiter 500 according to a first embodiment. In one example, the neutral current limiter 500 may be a first implementation of the neutral current limiter 404. The neutral current limiter 500 is configured to receive current reference signals IrefA, IrefB, IrefC 502 at an input, and provide secondary current reference signals IrefA', IrefB', IrefC' 504 at an output. In one example, the current reference signals 502 may be similar to the current reference signals 418, and the secondary current reference signals 504 may be similar to the modulated current reference signals 420.

The neutral current limiter 500 includes several logic modules including a summer module 506, a Root Mean Square (RMS) module 508, a reference limiter module 510, a divider module 512, and multiplier modules 514a, 514b, 514c. The summer module 506 is configured to receive the current reference signals 502, sum the current reference signals 502, and provide the sum IrefN to the RMS module 508. The RMS module 508 is configured to determine an RMS value of the sum IrefN to produce the RMS value IrefN$_{(rms)}$, and provide the RMS value IrefN$_{(rms)}$ to the reference limiter module 510 and the divider module 512.

The reference limiter module 510 is configured to analyze the RMS value IrefN$_{(rms)}$, and determine if the RMS value IrefN$_{(rms)}$ exceeds an RMS value of a maximum neutral current value IlimitN(rms) selected by a user. The reference limiter module 510 generates a modulated reference signal IrefN'(rms) based on the determination, and provides the modulated reference signal IrefN'(rms) to the divider module 512. In one embodiment, if IrefN$_{(rms)}$ exceeds IlimitN (rms), then IrefN'(rms) is set to IlimitN(rms). Otherwise, if IrefN$_{(rms)}$ does not exceed IlimitN(rms), then IrefN'(rms) is set to IrefN$_{(rms)}$. Stated mathematically, the reference limiter module 510 is configured to execute the following logical operation:

$$IrefN'(rms) = IrefN_{(rms)}, \text{ if } IrefN_{RMS} < IlimitN(rms)$$

$$IrefN'(rms) = IlimitN(rms), \text{ if } IrefN_{RMS} \geq IlimitN(rms)$$

The divider module 512 is configured to receive the RMS value IrefN$_{(rms)}$ and the modulated reference signal IrefN' (rms), determine a ratio of the modulated reference signal IrefN'(rms) to the RMS value IrefN$_{(rms)}$, and output a ratio signal indicative of the ratio to the multiplier modules 514a, 514b, 514c. For example, if the modulated reference signal IrefN'(rms) is equal to the RMS value IrefN$_{(rms)}$ (for example, if the reference limiter module 510 determines that IrefN$_{(rms)}$ has not exceeded the RMS value of the maximum neutral current value IlimitN(rms) selected by the user), then the ratio of the modulated reference signal IrefN'(rms) to the RMS value IrefN$_{(rms)}$ is 1. In another example, if the modulated reference signal IrefN' is one-half of the RMS value IrefN$_{(rms)}$ (for example, if the reference limiter module 510 determines that IrefN$_{(rms)}$ has exceeded the RMS value of the maximum neutral current value IlimitN(rms) selected by the user by twofold), then the ratio of the modulated reference signal IrefN'(rms) to the RMS value IrefN$_{(rms)}$ is ½.

Each of the multiplier modules 514a, 514b, 514c receives the ratio signal and multiplies the ratio signal by a corresponding current reference signal of the current reference signals IrefA, IrefB, IrefC 502 to yield the secondary current reference signals IrefA', IrefB', IrefC' 504. In one example, the multiplier module 514a multiplies the ratio signal by the current reference signal IrefA to produce the secondary current reference signal IrefA', the multiplier module 514b multiplies the ratio signal by the current reference signal IrefB to produce the secondary current reference signal IrefB', and the multiplier module 514c multiplies the ratio signal by the current reference signal IrefC to produce the secondary current reference signal IrefC'.

Accordingly, the neutral current limiter 500 is configured to modulate the secondary current reference signals IrefA', IrefB', IrefC' 504 at least partially based on the value of the current reference signals IrefA, IrefB, IrefC 502 relative to an RMS value of a maximum current value IlimitN(rms) set by a user. If the RMS value IrefN$_{(rms)}$ does not exceed the RMS value of the maximum current value IlimitN(rms) set by the user, then the secondary current reference signals 504 provided to the output are not altered relative to the current reference signals 502 received at the input. If the RMS value IrefN$_{(rms)}$ exceeds the RMS value of the maximum current value IlimitN(rms) set by the user, then the secondary current reference signals 504 are scaled relative to the current reference signals 502 by a proportion corresponding to the amount by which the RMS value IrefN$_{(rms)}$ exceeds the RMS value of the maximum current value IlimitN(rms) to maintain the neutral current level below the RMS value of the maximum current value IlimitN(rms).

Figure 6:
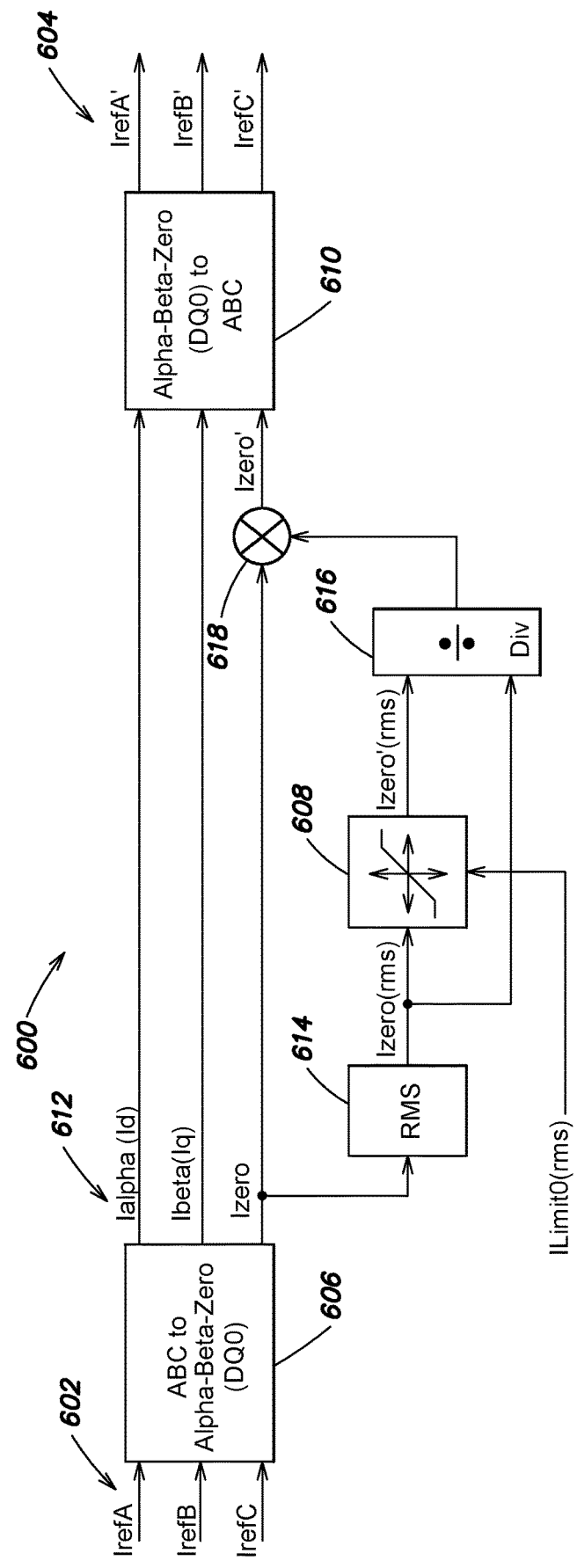
FIG. 6 illustrates a block diagram of a neutral current limiter according to an embodiment.

FIG. 6 illustrates a block diagram of a neutral current limiter 600 according to a second embodiment. In one example, the neutral current limiter 600 may be a second implementation of the neutral current limiter 404. The neutral current limiter 600 is configured to receive current reference signals IrefA, IrefB, IrefC 602 at an input, and provide secondary current reference signals IrefA', IrefB', IrefC' 604 at an output. In one example, the current reference signals 602 may be similar to the current reference signals 414, and the secondary current reference signals 604 may be similar to the secondary current reference signals 418.

The neutral current limiter 600 includes a first transformer module 606, a reference limiter module 608, a second transformer module 610, an RMS module 614, a divider module 616, and a multiplier module 618. The first transformer module 606 may be configured to transform the current reference signals 602 from a first coordinate system to a second coordinate system. For example, the first transformer module 606 may be configured to transform the current reference signals 602 to an orthogonal coordinate system. In one embodiment, the first transformer module 606 is configured to execute one of a Clarke transformation and a DQ0 stationary reference frame transformation to transform the current reference signals 602 to the orthogonal reference system.

In one example, the first current transformer module 610 is configured to execute a DQ0 stationary reference frame transformation to transform the current reference signals IrefA, IrefB, IrefC 602 to current reference signals Id, Iq, and Izero 612. Current reference signals Id and Iq may be provided to the second transformer module 610, and current reference signal Izero may be provided to the RMS module 614 and the multiplier module 618. The current reference signal Izero is equivalent to the average value of the current reference signals 602 and is equivalent to one-third of the neutral current IoutN.

The RMS module 614 is configured to determine an RMS value of the current reference signal Izero to generate the RMS current reference signal Izero(rms), and provide the RMS current reference signal Izero(rms) to the reference limiter module 608 and the divider module 616. The reference limiter module 608 may be configured to analyze the RMS current reference signal Izero(rms), and determine if the RMS current reference signal Izero(rms) exceeds a maximum neutral current value Ilimit0(rms) set by a user.

The reference limiter module 608 generates a modulated reference signal Izero'(rms) based on the determination, and provides the modulated reference signal Izero'(rms) to the divider module 616. In one embodiment, if Izero(rms) exceeds Ilimit0(rms), then Izero'(rms) is set to Ilimit0(rms). Otherwise, if Izero(rms) does not exceed Ilimit0(rms), then Izero'(rms) is set to Izero(rms). Stated mathematically, the reference limiter module 608 is configured to execute the following logical operation:

Izero'(rms)=Izero(rms), if Izero(rms)<IlimitO(rms)

Izero'(rms)=IlimitO(rms), if Izero(rms)≥IlimitO(rms)

The divider module 616 is configured to receive the modulated reference signal Izero'(rms) and the RMS current reference signal Izero(rms), and determine a ratio of the modulated reference signal Izero'(rms) to the RMS current reference signal Izero(rms). The divider module 616 outputs the ratio to the multiplier module 618. The multiplier module 618 is configured to receive the current reference signal Izero and the ratio of the modulated reference signal Izero'(rms) to the RMS current reference signal Izero(rms), multiply the current reference signal Izero and the ratio, and output the product Izero' to the second transformation module 610.

The second transformer module 610 is configured to receive the current reference signals Id, Iq, and Izero', and is configured to execute a transformation operation on the current reference signals Id, Iq, Izero' to produce the secondary current reference signals IrefA', IrefB', IrefC' 604. The secondary current reference signals 604 are therefore limited by the neutral current limiter 608 at least because the modulation of the current reference signal Izero' is propagated through the transformation by the second transformer module 610 to the secondary current reference signals 604.

Accordingly, the neutral current limiter 608 is configured to operate similarly to the neutral current limiter 510 by enforcing a maximum neutral current value through modulation of the current reference signals 602. In some embodiments, the neutral current limiter 608 may be advantageous at least because modulating the current reference signal Izero only modulates current which affects the neutral current provided by an APF. For example, components of the current provided by the APF which provide PFC are not affected by modulation of the current reference signal Izero.

Figure 7:
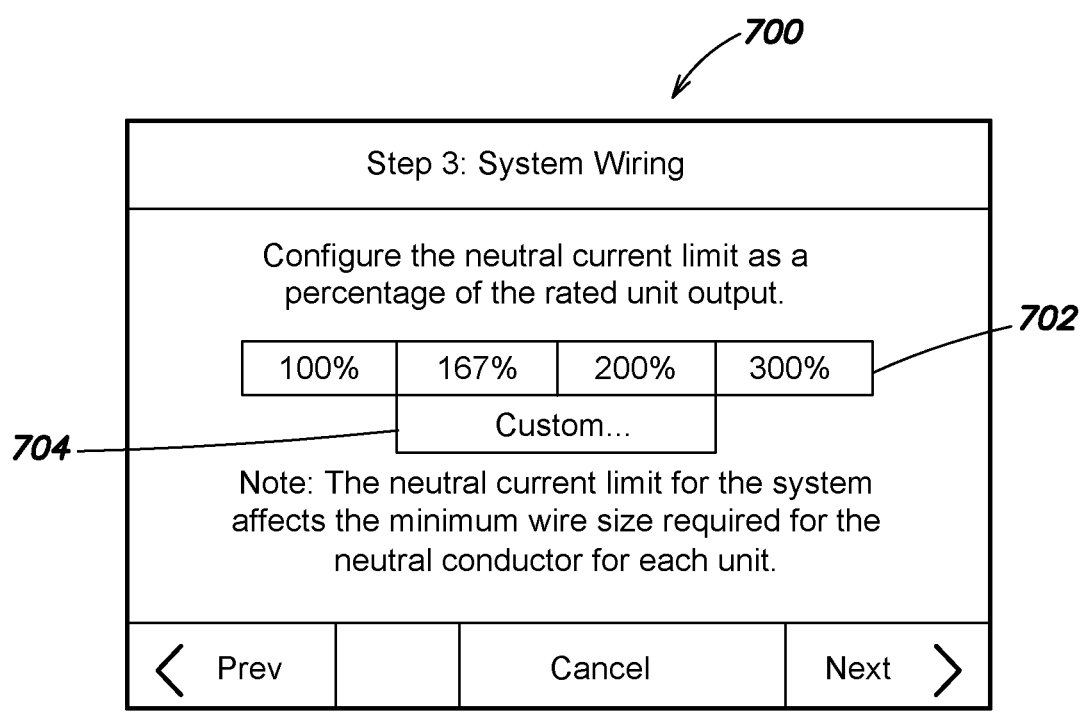
FIG. 7 illustrates a human machine interface according to an embodiment.

FIG. 7 illustrates a Human Machine Interface (HMI) 700 according to an embodiment. The HMI 700 may be coupled to APF control circuitry, such as the APF control circuitry 400, and may enable a user to specify a maximum neutral current value of the APF control circuitry. The HMI 700 may be mounted on a chassis containing the APF, or may be part of a separate device coupled to the APF through communication lines or through a wireless connection. For example, the HMI 700 may enable a user to select a maximum neutral current value corresponding to one of IlimitN(rms) and IlimitO(rms). In one embodiment, the HMI 700 may be configured to receive a selection of a maximum neutral current value from a user, generate the maximum neutral current value IlimitN(rms) or IlimitO(rms) pursuant to the user selection, and provide the maximum neutral current value IlimitN(rms) or IlimitO(rms) to the neutral current limiter 404.

The HMI 700 includes several percentage selections 702 and a custom selection 704. Responsive to a user selecting one of the percentage selections 702, a maximum neutral current value will be set to the corresponding percentage. Responsive to the user selecting the custom selection 704, the HMI 700 may prompt the user to specify any desired maximum neutral current value.

In one embodiment, the percentage value displayed by the HMI 700 refers to a percentage of the rated RMS current of a single phase a three-phase system. For example, in one embodiment, each phase of a three-phase APF coupled to the HMI 700 may be rated to deliver 100A of RMS current. Accordingly, a user selection of "167%" of the percentage selections 702 sets a maximum neutral RMS current value to 167A. For example, a user selection of "167%" of the percentage selections 702 may set the maximum neutral current value IlimitN to 167A. In other embodiments, the HMI 700 may enable a user to select a specific maximum current value expressed in Amperes. Moreover, in other embodiments, the HMI 700 may enable a user to select a maximum peak current value rather than selecting a maximum RMS current value.

As discussed above, the APF control circuitry 400 may control certain aspects of an APF, such as the APF 106. Using data stored in associated memory, the APF control circuitry 400 also executes one or more instructions stored on one or more non-transitory computer-readable media that may result in manipulated data. In some examples, the APF control circuitry 400 may include one or more processors or other types of controllers. In one example, the APF control circuitry 400 performs a portion of the functions disclosed herein on a processor and performs another portion using an Application-Specific Integrated Circuit (ASIC) tailored to perform particular operations. As illustrated by these examples, examples in accordance with the present invention may perform the operations described herein using many specific combinations of hardware and software and the invention is not limited to any particular combination of hardware and software components.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A power filter comprising:
   a first input configured to receive measurements of electrical characteristics of source power lines from a power source, wherein the source power lines include a first phase line, a second phase line, a third phase line and a neutral;
   a second input configured to receive measurements of electrical characteristics of load power lines to a load, wherein the load power lines include a first phase line, a second phase line, a third phase line and a neutral;
   an output configured to couple to output power lines to provide output current compensation signals, wherein the output power lines include a first phase line, a second phase line, a third phase line and a neutral;
   a power converter coupled to the output and configured to receive input power, receive control signals, and provide the output current compensation signals based on the control signals; and
   a controller coupled to the first input, the second input and the power converter and configured to provide the control signals to the power converter, wherein the controller has an input to receive an indication of a neutral current limit indicative of a maximum value of current for the neutral of the load power lines, and the controller is configured to adjust the control signals based on the indication of the neutral current limit to limit current on the neutral of the load power lines to the neutral current limit.

2. The power filter of claim 1, wherein the controller is further configured to limit current on the neutral of the load power lines by adjusting the control signals based on a ratio between the neutral current limit and a neutral current reference signal.

3. The power filter of claim 2, wherein the controller is further configured to generate reference signals, based on the measurements of electrical characteristics of the source power lines from the power source, to correct at least one of harmonic distortion, power factor and load balance created by the load, and the controller is configured to generate the neutral current reference signal based on the reference signals.

4. The power filter of claim 1, wherein the controller is further configured to generate reference signals, based on the measurements of electrical characteristics of the source power lines from the power source, to correct at least one of harmonic distortion, power factor and load balance created by the load, wherein the reference signals include a first phase reference signal, a second phase reference signal and a third phase reference signal and the controller is configured to perform an orthogonal transform on the reference signals and generate the control signals to limit the current on the neutral of the load power lines based on a result of the orthogonal transform.

5. The power filter of claim 1, further comprising a user interface, coupled to the controller, to receive the indication of the neutral current limit from a user.

6. The power filter of claim 5, wherein the indication of the neutral current limit is input by a user as a percentage of a rated output of the power filter.

7. The power filter of claim 1, wherein the output current compensation signals are AC output current signals, and wherein the power converter is configured to receive input power and to provide the output AC current signals based on the control signals.

8. The power filter of claim 1, wherein the control signals are configured to control the power converter using pulse width modulation.

9. A method of operating a power filter to control characteristics of power from a source to a load, the method comprising:
receiving measurements of electrical characteristics of source power lines from the power source, wherein the source power lines include a first phase line, a second phase line, a third phase line and a neutral;
receiving measurements of electrical characteristics of load power lines to the load, wherein the load power lines include a first phase line, a second phase line, a third phase line and a neutral;
providing output power current compensation signals at output power lines, wherein the output power lines include a first phase line, a second phase line, a third phase line and a neutral;
receiving an indication of a neutral current limit, the neutral current limit being indicative of a maximum value of current for the neutral of the load power lines; and
controlling current on the neutral of the load power lines based on the indication of the neutral current limit.

10. The method of claim 9, wherein the power filter includes a power converter that receives control signals and provides the output power current compensation signals based on the control signals, and wherein the method further includes limiting current on the neutral of the load power lines by adjusting the control signals based on a ratio between the neutral current limit and a neutral current reference signal.

11. The method of claim 10, wherein providing output power current compensation signals includes correcting at least one of harmonic distortion, power factor and load balance created by the load.

12. The method of claim 9, wherein the power filter includes a power converter that receives control signals and provides the output power current compensation signals based on the control signals, and wherein the method further includes generating reference signals, based on the measurements of electrical characteristics of the source power lines from the power source, to correct at least one of harmonic distortion, power factor and load balance created by the load, wherein the reference signals include a first phase reference signal, a second phase reference signal and a third phase reference signal, and wherein the method further includes performing an orthogonal transform on the reference signals and generating the control signals to limit the current on the neutral of the load power lines based on a result of the orthogonal transform.

13. The method of claim 9, further comprising receiving the indication of the neutral current limit from a user through a user interface.

14. The method of claim 13, wherein the indication of the neutral current limit is input by a user as a percentage of a rated output of the power filter.

15. The method of claim 9, wherein the output power current compensation signals are AC output current signals, and wherein the method further includes receiving AC power, converting the AC power to DC power and converting the DC power to AC power based on the control signals.

16. The method of claim 15, further comprising converting the DC power to AC power using pulse width modulation.

17. A power filter comprising:
a first input configured to receive measurements of electrical characteristics of source power lines from a power source, wherein the source power lines include a first phase line, a second phase line, a third phase line and a neutral;
a second input configured to receive measurements of electrical characteristics of load power lines to a load, wherein the load power lines include a first phase line, a second phase line, a third phase line and a neutral;
an output configured to couple to output power lines to provide output current compensation signals, wherein the output power lines include a first phase line, a second phase line, a third phase line and a neutral;
a power converter coupled to the output and configured to receive input power, receive control signals and provide the output current compensation signals based on the control signals; and
a modulator for modulating the control signals based on a received indication of a neutral current limit, the neutral current limit being indicative of a maximum value of current for the neutral of the load power lines.

18. The power filter of claim 17, further comprising a user interface, to receive the indication of the neutral current limit from a user.

19. The power filter of claim 18, wherein the indication of the neutral current limit is input by a user as a percentage of a rated output of the power filter.

20. The power filter of claim 17, wherein the power converter is further configured to provide the output current compensation signals to correct at least one of harmonic distortion, power factor and load balance created by the load.

* * * * *